United States Patent Office 3,551,811
Patented Dec. 29, 1970

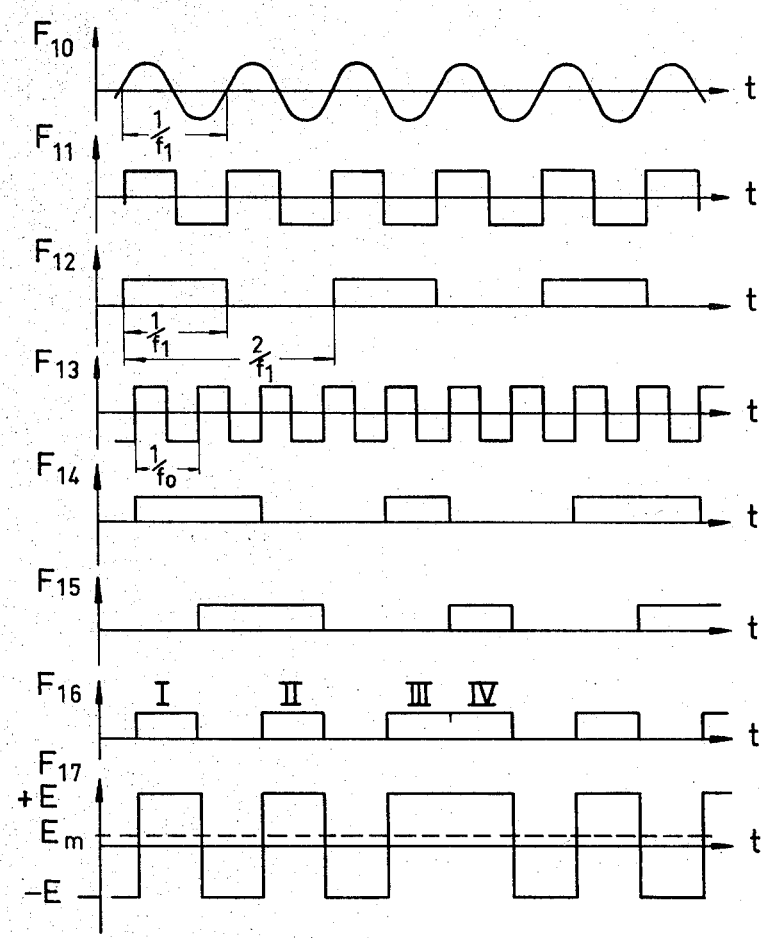

3,551,811
METHOD AND APPARATUS FOR DETERMINING THE FREQUENCY OF AN ELECTRICAL SIGNAL
Gunnar Axel Kihlberg, Stockholm, Sweden, assignor to Jungner Instrument Aktiebolag, Stockholm, Sweden, an organization of Sweden
Filed Sept. 4, 1968, Ser. No. 757,380
Claims priority, application Sweden, Sept. 20, 1967, 12,947/67
Int. Cl. G01p *3/12*
U.S. Cl. 324—173
2 Claims

ABSTRACT OF THE DISCLOSURE

A speed measuring apparatus and method which produces a D.C. output signal related in magnitude to the speed or frequency of rotation ($f_x$) and in polarity to the direction of rotation being monitored. With a reference source of $f_0$ a pulse signal whose repetition rate is related to $f_1$, where $$f_1 = \frac{f_0}{2} + nf_x$$

is formed. The duration of the pulses are related to $1/f_0$. This signal forms one input to an Exclusive "OR." The other input is the identical signal, delay $1/f_0$. The output of the Exclusive "OR" controls a gate to apply either a positive or negative voltage of predetermined magnitude to an averaging circuit. The output of the averaging circuit is proportional in magnitude to $f_x$ and its polarity is an indication of the rotational direction being monitored.

---

A number of different methods of determining the frequency of an electrical signal are previously known. In most of them, however, the accuracy of measurement is comparatively moderate, unless extremely complicated and thus costly equipment are employed.

The present invention relates to a novel method of determining the frequency of an electrical signal which enables a very high accuracy of measurement without requiring too advanced equipment.

The method according to the invention is primarily characterized in that a reference signal with an accurately fixed frequency $f_0$ is utilized for generating a number of pulses the frequency of which is proportional to the frequency $f$ of the signal to be measured, said pulses having a duration which is inversely proportional to the frequency $f_0$ of the reference signal, and that a D.C. voltage of the type $$A + B \cdot \frac{f}{f_0}$$

is derived from said pulses where A and B are constants.

The two constants A and B can be given any arbitrary value by suitable design of the equipment to be employed, for instance, to eliminate the constant value of the D.C. voltage obtained, it is possible to select $A=0$.

The method according to the invention may advantageously be utilized for speed control in using a tachometer generator or the like. The A.C. voltage thereby generated has a frequency which is directly proportional to the number of revolutions $f_{rot}$ to be measured, said frequency being determined according to the above stated method. A particular advantage of the method according to the invention resides in that it will permit directional speed measurements. In this particular application, the method according to the invention is substantially characterized in that a resolver is used as a tachometer generator, said resolver being supplied with an A.C. voltage of a frequency directly proportional to the frequency $f_0$ of the reference signal, and that a D.C. voltage of the form $$C \cdot \frac{f_{rot}}{f_0}$$

is derived from pulses being formed with a duration inversely proportional to the frequency $f_0$ of the reference signal, where C is a constant and $f_{rot}$ is positive or negative depending on the direction of rotation of the tachometer generator.

The invention further relates to an apparatus for carrying out the above-defined method. Such apparatus substantially comprises reference signal means generating a reference signal with an accurately fixed frequency $f_0$, means for generating pulses to the number directly proportional to the frequency $f$ of the voltage to be investigated and having a duration inversely proportional to the frequency $f_0$ of the reference signal, and means for deriving from said pulses a D.C. voltage of the type $$A + B \cdot \frac{f}{f_0}$$

where A and B are constants.

Some embodiments of the invention will now be described more in detail by way of examples, reference being made to the accompanying drawings, in which:

FIG. 4 shows graphs of various signals appearing in the apparatus according to FIG. 3.

Figure 1:
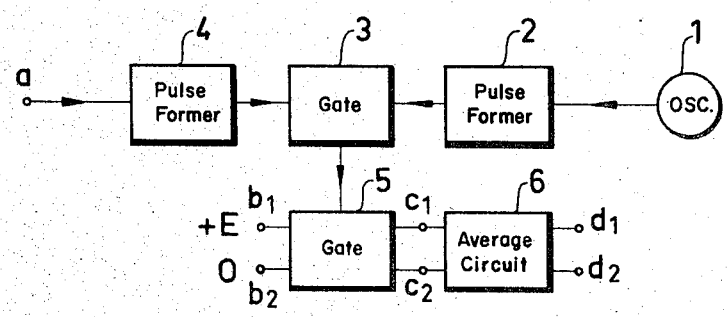
FIG. 1 shows a block diagram of an apparatus for determining the frequency of an electrical signal according to the method of the invention.

In FIG. 1, numeral 1 designates means for generating a reference signal consisting of an A.C. voltage having an accurately determined frequency $f_0$ and feeding a first pulse-forming network 2 emitting an output signal consisting of pulses with a frequency $f_0$ and a duration which is inversely proportional to said frequency. These pulses are supplied to one input of a selecting network 3 the second input of which is supplied with control pulses from a second pulse-forming network 4 which at its input terminal $a$ is supplied with the signal the frequency of which is to be determined. The output of the selecting network 3 is connected to the control input of a gate circuit 5, the second input of which being biased via two terminals $b_1$ and $b_2$, with a D.C. voltage of constant and accurately determined magnitude E. The output of the gate circuit 5 is connected via two terminals $c_1$ and $c_2$ to the input of an averaging circuit 6 having its output connected to the terminals $d_1$ and $d_2$.

Figure 2:
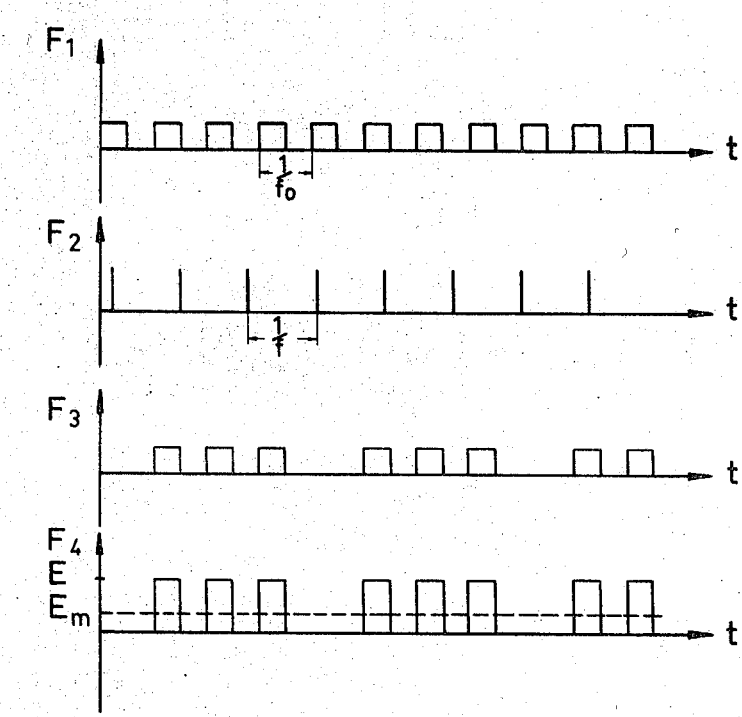
FIG. 2 shows graphs of various signals appearing in the apparatus according to FIG. 1.

The function of the apparatus so far described will now be explained more in detail with reference to FIG. 2, in which $F_1$ designates the output signal from network 2, $F_2$ the output signal from network 4, $F_3$ the output signal from selecting network 3, and $F_4$ the output signal from gate circuit 5. The pulse-forming network 2 emits a pulse train of frequency $f_0$ and pulse duration $$\frac{1}{k \cdot f_0}$$

after being gated with an A.C. voltage of frequency $f_0$ from the reference signal source 1. In the relation $$\frac{1}{k \cdot f_0}$$

$k$ is a constant greater than or equal to 1. In FIG. 2 it has been assumed that $k=2$. The pulse-forming network 4 which is connected to the input terminal $a$ generates a pulse train with a frequency directly proportional to the frequency $f$ of the signal to be investigated which is supplied to terminal $a$. In FIG. 2 it has been assumed, for the sake of simplicity, that the pulse frequency is equal to $f$ and that the pulse duration is very short. The output signal from network 4 will actuate the selecting network 3 so that each pulse of the pulse train $F_1$ will pass to the gate circuit 5 after a pulse of signal $F_2$ has appeared. The output signal $F_3$ from selecting network 3 will then have the form as shown in FIG. 2.

It should be noticed that one condition for each pulse of signal $F_2$ to transfer a pulse from signal $F_1$ to signal $F_3$ resides in that the pulse frequency of signal $F_2$ is lower than that of signal $F_1$. If the pulse frequency of $F_2$ is higher than that of $F_1$, then the apparatus will deliver an output signal of the type $$A + B \frac{f_2 - (m-1) \cdot f_0}{f_0}$$

for the intermal $(m-1) \geq f_2 \geq m \cdot f_0$, where $m$ designates a positive integer and $f_2$ the pulse frequency of $F_2$.

The output signal $F_3$ from the selecting network 3 is supplied to the control input of a gate circuit 5 which at its output terminals $c_1$ and $c_2$ emits an output signal $F_4$ forming a series of pulses coexisting in time with the pulses of signal $F_3$ and having an amplitude E which is equal to the magnitude of D.C. voltage E being supplied to terminals $b_1$ and $b_2$. The output signal $F_4$ from the gate circuit 5 is converted in the averaging circuit 6 into a D.C. voltage with constant magnitude $E_m$ corresponding to the mean value of signal $F_4$. The voltage $E_m$ is represented by the broken line shown in FIG. 2.

Figure 3:
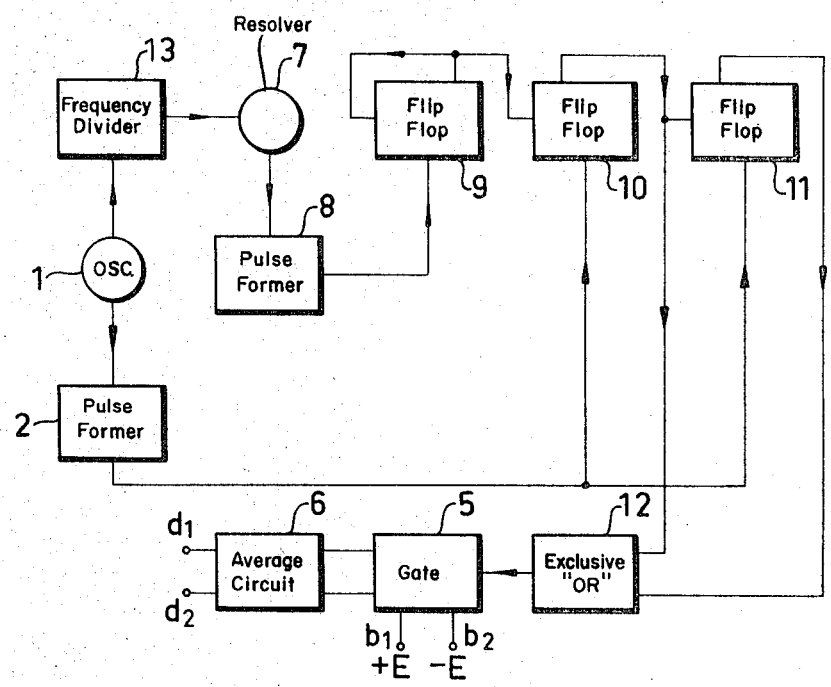
FIG. 3 shows a block diagram of a directional speed measuring arrangement according to the invention.

In conformity with the apparatus shown in FIG. 1 the apparatus in FIG. 3 comprises a reference signal source 1, a pulse-forming network 2, a gate circuit 5 and an averaging circuit 6, whereas networks 3 and 4 of FIG. 1 have been replaced by circuits 8, 9, 10, 11, and 12 respectively. The apparatus shown in FIG. 3, in addition to the circuits mentioned, comprises a tachometer generator 7 connected to a shaft or the like of which the speed of rotation is to be measured. Furthermore, a frequency divider 13 is connected between the reference signal source 1 and the tachometer generator 7.

The tachometer generator 7 consists of a resolver being supplied from divider 13 with an A.C. voltage with the frequency $f_0/2$, where $f_0$ is the frequency of the output signal from the reference signal source 1. The resolver delivers an output signal $F_{10}$ in the form of an A.C. voltage with the frequency $$f_1 = \frac{f_0}{2} + n \cdot f_{rot}$$

where $n$ means the number of pole pairs of the resolver and $f_{rot}$ the speed of rotation. The output signal of the resolver is supplied to the input of circuit 8 which, by amplifying and clipping operations, provides an output signal $F_{11}$ forming a square wave of the frequency $f_1$. This signal is supplied to the triggering input of the circuit 9 acting as a storage circuit and emitting an output signal $F_{12}$ forming positive pulses of the frequency $f_1/2$ having a duration of $1/f_1$. These pulses are supplied to the "master-value"-input of circuit 10 which, similarly to circuit 9, consists of a storage circuit being gated with a square wave $F_{13}$ with the frequency $f_0$ and fed by pulse-forming network 2. Circuit 10 emits an output signal $F_{14}$ containing $f_1/2$ pulses per second, the leading edges of which are synchronized with the positive-going zero passages of the output signal $F_{13}$ from network 2 and are of a duration corresponding to the time period $1/f_0$ of the signal $F_{13}$, or an integer multiple of this time period. The output signal $F_{14}$ from the circuit 10 is supplied to a "master-value"-input of circuit 11, which also consists of a storage circuit and, similarly to circuit 10, is fed with the output signal $F_{13}$ from network 2. The output signal $F_{15}$ from storage circuit 11 corresponds to the output signal $F_{14}$ from circuit 10, except that signal $F_{15}$ is phase displaced the amount $1/f_0$ relative to signal $F_{14}$. The two output signals $F_{14}$ and $F_{15}$ from circuits 10 and 11 are supplied to respective inputs of an EXCLUSIVE-OR gate 12, that is, a gate which emits an output signal having a value deviating from zero only during the time intervals when pulses appear at either the first or the second of its two inputs but not at the two inputs simultaneously. The output signal $F_{16}$ from gate 12 are supplied to the control or triggering input of gate circuit 5, being supplied with a D.C. voltage at its input terminals $b_1$ and $b_2$ and having a magnitude of 2E, said D.C. voltage being symmetrical relative to earth potential. The output signal $F_{17}$ from circuit 5 is supplied to the averaging circuit 6 which emits a D.C. voltage at its output terminals $d_1$ and $d_2$ having a magnitude $E_m$ equal to the mean value of the output signal $F_{17}$ from circuit 5 which varies between the values $+E$ and $-E$.

As appears from the diagram of FIG. 4, the gate 12 generating the signal $F_{16}$ produces a pulse of the time duration $1/f_0$ for each change of signal $F_{12}$ whereby some of the pulses (such as pulses I and II, for example) appear spaced in time, whereas other pulses (such as pulses III and IV, for example) appear immediately after each other. Since the number of changes per second taking place in signal $F_{12}$ is equal to $f_1$, the output voltage from circuit 6 can be expressed in the following formula:

$$E_m = f_1 \cdot \frac{1}{f_0} \cdot E - \left(1 - f_1 \cdot \frac{1}{f_0}\right) \cdot E = \frac{2f_1 - f_0}{f_0} \cdot E$$

If $$f_1 = \frac{f_0}{2} + n \cdot f_{rot}$$

the expression will be:

$$E_m = \frac{2 \cdot n \cdot f_{rot}}{f_0} \cdot E$$

This voltage will change signs if the direction of rotation of the resolver is reversed, thereby enabling determination of not only the magnitude of the speed of rotation of the resolver, but also the direction of rotation.

What I claim is:

1. A speed measuring apparatus including a resolver rotating at the speed to be measured for generating an A.C. voltage with a frequency proportional to the algebraic sum of a term proportional to a reference frequency $F_0$ and a term proportional to $F_{rot}$ corresponding to the speed of rotation to be measured, means supplying said resolver with an A.C. voltage of a frequency directly proportional to the reference frequency $F_0$, pulse forming means supplied by said resolver and supplying pulses whose duration is inversely proportional to the frequency produced by said resolver, a bistable device receiving as inputs a pulse signal with frequency of $F_0$ and the pulse signal supplied by said pulse forming means, said bistable device producing a pulse train having pulses corresponding to the pulses produced by said pulse forming means, each pulse being initiated with the occurrence of a pulse of frequency $F_0$ subsequent to the initiation of a pulse from said pulse forming means, and being terminated by the next pulse of frequency $F_0$ which occurs subsequent to the termination of the pulse produced by said pulse forming means, means for delaying the output of said bistable device for a time inversely proportional to $F_0$, An Exclusive "OR" gate receiving as inputs the output of said means for delaying and the output of said bistable device, a second gate controlled by the out-output of said Exclusive "OR" gate and providing a voltage of predetermined magnitude and polarity when said "OR" gate produces an output and a voltage of the same magnitude but opposite polarity when said "OR" gates does not produce an output, and an averaging circuit controlled by the output of said second gate to produce a voltage proportional in magnitude to said unknown frequency and related in polarity to direction of rotation of said resolver.

2. A method of measuring the frequency of an unknown signal comprising the steps of, mixing the unknown signal with a signal which is proportional in frequency to a reference frequency $F_0$, to produce a resultant signal having a frequency $F_1$ equal to the sum of a term proportional to said reference frequency $F_0$ and a term equal to frequency of said unknown signal, shaping said resultant signal to produce a first pulse train, the pulses of which are inversely proportional in duration to the resultant frequency $F_1$, providing a second pulse train having a frequency equal to said reference frequency $F_0$, producing a third pulse train having individual pulses corresponding to pulses of said first pulse train, each pulse being initiated with the occurrence of a pulse from said second pulse train subsequent to initiation of a pulse from said first pulse train and being terminated at the initiation of a pulse from said second pulse train which occurs subsequent to the termination of the pulse of said first pulse train, producing a fourth pulse train by delaying said third pulse train by a time inversely proportional to said reference frequency, applying said third and fourth pulse trains respectively as inputs to an Exclusive "OR" circuit, providing a first voltage of predetermined magnitude and polarity when said "OR" circuit produces an output and providing a second voltage of the same magnitude but opposite polarity when said "OR" circuit does not produce an output, and averaging said first and second voltage signals to produce output proportional to the frequency of said unknown signal.

References Cited

UNITED STATES PATENTS

| 3,253,218 | 5/1966 | Mayer | 324—70 |
| 3,094,629 | 6/1963 | Ostroff | 324—70 |

MICHAEL J. LYNCH, Primary Examiner

U.S. Cl. X.R.

324—79